(12) United States Patent  
Boulanger et al.

(10) Patent No.: US 8,947,353 B2
(45) Date of Patent: Feb. 3, 2015

(54) PHOTOSENSOR ARRAY GESTURE DETECTION

(75) Inventors: Catherine N. Boulanger, Redmond, WA (US); Paul Henry Dietz, Redmond, WA (US); Steven Nabil Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 155 days.

(21) Appl. No.: 13/494,651

(22) Filed: Jun. 12, 2012

(65) Prior Publication Data

US 2013/0328761 A1 Dec. 12, 2013

(51) Int. Cl.
*G09G 5/00* (2006.01)

(52) U.S. Cl.
USPC .............................. 345/156; 715/862; 715/863

(58) Field of Classification Search
CPC ..................................................... G06F 1/1694
USPC ........................... 345/156, 173; 715/862, 863
See application file for complete search history.

(56) References Cited

U.S. PATENT DOCUMENTS

| | | | |
|---|---|---|---|
| 4,046,975 A | 9/1977 | Seeger, Jr. | |
| 4,065,649 A | 12/1977 | Carter et al. | |
| 4,243,861 A | 1/1981 | Strandwitz | |
| 4,302,648 A | 11/1981 | Sado et al. | |
| 4,317,013 A | 2/1982 | Larson | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,588,187 A | 5/1986 | Dell | |
| 4,607,147 A | 8/1986 | Ono et al. | |
| 4,651,133 A | 3/1987 | Ganesan et al. | |

(Continued)

FOREIGN PATENT DOCUMENTS

| EP | 2353978 | 8/2011 |
|---|---|---|
| JP | H07218865 | 8/1995 |

(Continued)

OTHER PUBLICATIONS

"Accessing Device Sensors ", retrieved from <https://developer.palm.com/content/api/dev-guide/pdk/accessing-device-sensors.html> on May 25, 2012, 4 pages.

(Continued)

*Primary Examiner* — Kevin M Nguyen
(74) *Attorney, Agent, or Firm* — Jeremy Snodgrass; Judy Yee; Micky Minhas

(57) ABSTRACT

Photosensor array gesture detection techniques are described. In one or more embodiments, a computing device includes an array of photosensors. The photosensor array can be configured in various ways to measure changes in the amount of light that occur based upon a user's hand position above the photosensor array. In at least some embodiments, capacitance associated with the photosensors is charged and data regarding discharge rates for the sensors is collected that is indicative of the amount of incident light. Sequential changes in the amount of light that is measured across the array of photosensors can be used to determine positioning and/or movement of the user's hand in three dimensions (e.g., track position/motion in three-dimensional (3D) space relative to the computing device.) Accordingly, various gestures can be defined in terms of input obtained via the photosensor array and recognized to trigger corresponding operations by the computing device.

20 Claims, 7 Drawing Sheets

(56) References Cited

U.S. PATENT DOCUMENTS

| | | |
|---|---|---|
| 4,735,495 A | 4/1988 | Henkes |
| 5,220,521 A | 6/1993 | Kikinis |
| 5,283,559 A | 2/1994 | Kalendra et al. |
| 5,319,455 A | 6/1994 | Hoarty et al. |
| 5,331,443 A | 7/1994 | Stanisci |
| 5,548,477 A | 8/1996 | Kumar et al. |
| 5,558,577 A | 9/1996 | Kato |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,806,955 A | 9/1998 | Parkyn, Jr. et al. |
| 5,807,175 A | 9/1998 | Davis et al. |
| 5,808,713 A | 9/1998 | Broer et al. |
| 5,818,361 A | 10/1998 | Acevedo |
| 5,828,770 A | 10/1998 | Leis et al. |
| 5,838,403 A | 11/1998 | Jannson et al. |
| 5,874,697 A | 2/1999 | Selker et al. |
| 5,926,170 A | 7/1999 | Oba |
| 5,967,637 A | 10/1999 | Ishikawa et al. |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,072,551 A | 6/2000 | Jannson et al. |
| 6,112,797 A | 9/2000 | Colson et al. |
| 6,124,906 A | 9/2000 | Kawada et al. |
| 6,129,444 A | 10/2000 | Tognoni |
| 6,178,443 B1 | 1/2001 | Lin |
| 6,254,105 B1 | 7/2001 | Rinde et al. |
| 6,256,447 B1 | 7/2001 | Laine |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,437,682 B1 | 8/2002 | Vance |
| 6,511,378 B1 | 1/2003 | Bhatt et al. |
| 6,529,179 B1 | 3/2003 | Hashimoto et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,648,485 B1 | 11/2003 | Colgan et al. |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,867,828 B2 | 3/2005 | Taira et al. |
| 6,870,671 B2 | 3/2005 | Travis |
| 6,895,164 B2 | 5/2005 | Saccomanno |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 6,980,177 B2 | 12/2005 | Struyk |
| 6,981,792 B2 | 1/2006 | Nagakubo et al. |
| 7,006,080 B2 | 2/2006 | Gettemy |
| 7,051,149 B2 | 5/2006 | Wang et al. |
| 7,083,295 B1 | 8/2006 | Hanna |
| 7,091,436 B2 | 8/2006 | Serban |
| 7,104,679 B2 | 9/2006 | Shin et al. |
| 7,106,222 B2 | 9/2006 | Ward et al. |
| 7,123,292 B1 | 10/2006 | Seeger et al. |
| 7,153,017 B2 | 12/2006 | Yamashita et al. |
| 7,194,662 B2 | 3/2007 | Do et al. |
| 7,213,991 B2 | 5/2007 | Chapman et al. |
| 7,224,830 B2 | 5/2007 | Nefian et al. |
| 7,260,221 B1 | 8/2007 | Atsmon |
| 7,260,823 B2 | 8/2007 | Schlack et al. |
| 7,277,087 B2 | 10/2007 | Hill et al. |
| 7,370,342 B2 | 5/2008 | Ismail et al. |
| 7,374,312 B2 | 5/2008 | Feng et al. |
| 7,375,885 B2 | 5/2008 | Ijzerman et al. |
| 7,384,178 B2 | 6/2008 | Sumida et al. |
| 7,400,377 B2 | 7/2008 | Evans et al. |
| 7,400,817 B2 | 7/2008 | Lee et al. |
| 7,410,286 B2 | 8/2008 | Travis |
| 7,431,489 B2 | 10/2008 | Yeo et al. |
| 7,447,934 B2 | 11/2008 | Dasari et al. |
| 7,469,386 B2 | 12/2008 | Bear et al. |
| 7,499,037 B2 | 3/2009 | Lube |
| 7,502,803 B2 | 3/2009 | Culter et al. |
| 7,503,684 B2 | 3/2009 | Ueno et al. |
| 7,528,374 B2 | 5/2009 | Smitt et al. |
| 7,542,052 B2 | 6/2009 | Solomon et al. |
| 7,545,429 B2 | 6/2009 | Travis |
| 7,558,594 B2 | 7/2009 | Wilson |
| 7,559,834 B1 | 7/2009 | York |
| 7,572,045 B2 | 8/2009 | Hoelen et al. |
| RE40,891 E | 9/2009 | Yasutake |
| 7,631,327 B2 | 12/2009 | Dempski et al. |
| 7,636,921 B2 | 12/2009 | Louie |
| 7,639,876 B2 | 12/2009 | Clary et al. |
| 7,656,392 B2 | 2/2010 | Bolender |
| 7,660,047 B1 | 2/2010 | Travis et al. |
| 7,675,598 B2 | 3/2010 | Hong |
| 7,728,923 B2 | 6/2010 | Kim et al. |
| 7,733,326 B1 | 6/2010 | Adiseshan |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,777,972 B1 | 8/2010 | Chen et al. |
| 7,782,341 B2 | 8/2010 | Kothandaraman |
| 7,782,342 B2 | 8/2010 | Koh |
| 7,813,715 B2 | 10/2010 | McKillop et al. |
| 7,815,358 B2 | 10/2010 | Inditsky |
| 7,844,985 B2 | 11/2010 | Hendricks et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,936,501 B2 | 5/2011 | Smith et al. |
| 7,945,717 B2 | 5/2011 | Rivalsi |
| 7,957,082 B2 | 6/2011 | Mi et al. |
| 7,965,268 B2 | 6/2011 | Gass et al. |
| 7,970,246 B2 | 6/2011 | Travis et al. |
| 7,973,771 B2 | 7/2011 | Geaghan |
| 7,978,281 B2 | 7/2011 | Vergith et al. |
| 7,991,257 B1 | 8/2011 | Coleman |
| 8,007,158 B2 | 8/2011 | Woo et al. |
| 8,018,579 B1 | 9/2011 | Krah |
| 8,053,688 B2 | 11/2011 | Conzola et al. |
| 8,065,624 B2 | 11/2011 | Morin et al. |
| 8,069,356 B2 | 11/2011 | Rathi et al. |
| 8,098,233 B2 | 1/2012 | Hotelling et al. |
| 8,115,499 B2 | 2/2012 | Osoinach et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,189,973 B2 | 5/2012 | Travis et al. |
| 8,229,509 B2 | 7/2012 | Paek et al. |
| 8,229,522 B2 | 7/2012 | Kim et al. |
| 8,251,563 B2 | 8/2012 | Papakonstantinou et al. |
| 8,310,508 B2 | 11/2012 | Hekstra et al. |
| 8,325,416 B2 | 12/2012 | Lesage et al. |
| 8,354,806 B2 | 1/2013 | Travis et al. |
| 8,362,975 B2 | 1/2013 | Uehara |
| 8,467,133 B2 | 6/2013 | Miller |
| 8,548,608 B2 | 10/2013 | Perek et al. |

(56) References Cited

U.S. PATENT DOCUMENTS

| | | |
|---|---|---|
| 8,565,560 B2 | 10/2013 | Popovich et al. |
| 8,614,666 B2 | 12/2013 | Whitman et al. |
| 8,903,517 B2 | 12/2014 | Perek et al. |
| 2002/0008854 A1 | 1/2002 | Travis et al. |
| 2002/0134828 A1 | 9/2002 | Sandbach et al. |
| 2002/0163510 A1 | 11/2002 | Williams et al. |
| 2003/0137821 A1 | 7/2003 | Gotoh et al. |
| 2003/0197687 A1 | 10/2003 | Shetter |
| 2004/0258924 A1 | 12/2004 | Berger et al. |
| 2004/0268000 A1 | 12/2004 | Barker et al. |
| 2005/0055498 A1 | 3/2005 | Beckert et al. |
| 2005/0057515 A1 | 3/2005 | Bathiche |
| 2005/0059489 A1 | 3/2005 | Kim |
| 2005/0062715 A1 | 3/2005 | Tsuji et al. |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2005/0285703 A1 | 12/2005 | Wheeler et al. |
| 2006/0010400 A1 | 1/2006 | Dehlin et al. |
| 2006/0012767 A1 | 1/2006 | Komatsuda et al. |
| 2006/0028838 A1 | 2/2006 | Imade |
| 2006/0083004 A1 | 4/2006 | Cok |
| 2006/0085658 A1 | 4/2006 | Allen et al. |
| 2006/0102914 A1 | 5/2006 | Smits et al. |
| 2006/0125799 A1 | 6/2006 | Hillis et al. |
| 2006/0132423 A1 | 6/2006 | Travis |
| 2006/0146573 A1 | 7/2006 | Iwauchi et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0215244 A1 | 9/2006 | Yosha et al. |
| 2007/0019181 A1 | 1/2007 | Sinclair et al. |
| 2007/0046625 A1 | 3/2007 | Yee |
| 2007/0047221 A1 | 3/2007 | Park |
| 2007/0062089 A1 | 3/2007 | Homer et al. |
| 2007/0072474 A1 | 3/2007 | Beasley et al. |
| 2007/0076434 A1 | 4/2007 | Uehara et al. |
| 2007/0182663 A1 | 8/2007 | Biech |
| 2007/0182722 A1 | 8/2007 | Hotelling et al. |
| 2007/0188478 A1 | 8/2007 | Silverstein et al. |
| 2007/0201246 A1 | 8/2007 | Yeo et al. |
| 2007/0217224 A1 | 9/2007 | Kao et al. |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0247432 A1 | 10/2007 | Oakley |
| 2007/0260892 A1 | 11/2007 | Paul et al. |
| 2007/0274094 A1 | 11/2007 | Schultz et al. |
| 2007/0274095 A1 | 11/2007 | Destain |
| 2007/0274099 A1 | 11/2007 | Tai et al. |
| 2007/0283179 A1 | 12/2007 | Burnett et al. |
| 2008/0005423 A1 | 1/2008 | Jacobs et al. |
| 2008/0013809 A1 | 1/2008 | Zhu et al. |
| 2008/0019150 A1 | 1/2008 | Park et al. |
| 2008/0037284 A1 | 2/2008 | Rudisill |
| 2008/0104437 A1 | 5/2008 | Lee |
| 2008/0122803 A1 | 5/2008 | Izadi et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0211787 A1 | 9/2008 | Nakao et al. |
| 2008/0219025 A1 | 9/2008 | Spitzer et al. |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0316768 A1 | 12/2008 | Travis |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0140985 A1 | 6/2009 | Liu |
| 2009/0146992 A1 | 6/2009 | Fukunaga et al. |
| 2009/0152748 A1 | 6/2009 | Wang et al. |
| 2009/0161385 A1 | 6/2009 | Parker et al. |
| 2009/0167728 A1 | 7/2009 | Geaghan et al. |
| 2009/0195497 A1 | 8/2009 | Fitzgerald et al. |
| 2009/0231275 A1 | 9/2009 | Odgers |
| 2009/0239586 A1 | 9/2009 | Boeve et al. |
| 2009/0244832 A1 | 10/2009 | Behar et al. |
| 2009/0251008 A1 | 10/2009 | Sugaya |
| 2009/0262492 A1 | 10/2009 | Whitchurch et al. |
| 2009/0265670 A1 | 10/2009 | Kim et al. |
| 2009/0285491 A1 | 11/2009 | Ravenscroft et al. |
| 2009/0303204 A1 | 12/2009 | Nasiri et al. |
| 2009/0316072 A1 | 12/2009 | Okumura et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045609 A1 | 2/2010 | Do et al. |
| 2010/0045633 A1 | 2/2010 | Gettemy et al. |
| 2010/0051356 A1 | 3/2010 | Stern et al. |
| 2010/0051432 A1 | 3/2010 | Lin et al. |
| 2010/0053534 A1 | 3/2010 | Hsieh et al. |
| 2010/0077237 A1 | 3/2010 | Sawyers |
| 2010/0079861 A1 | 4/2010 | Powell |
| 2010/0081377 A1 | 4/2010 | Chatterjee et al. |
| 2010/0085321 A1 | 4/2010 | Pundsack |
| 2010/0103112 A1 | 4/2010 | Yoo et al. |
| 2010/0123686 A1 | 5/2010 | Klinghult et al. |
| 2010/0135036 A1 | 6/2010 | Matsuba et al. |
| 2010/0149111 A1 | 6/2010 | Olien |
| 2010/0149134 A1 | 6/2010 | Westerman et al. |
| 2010/0156798 A1 | 6/2010 | Archer |
| 2010/0156913 A1 | 6/2010 | Ortega et al. |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0214214 A1 | 8/2010 | Corson et al. |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0238138 A1 | 9/2010 | Goertz et al. |
| 2010/0245289 A1 | 9/2010 | Svajda |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0299642 A1* | 11/2010 | Merrell et al. ............... 715/863 |
| 2010/0302378 A1 | 12/2010 | Marks et al. |
| 2010/0304793 A1 | 12/2010 | Kim et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321339 A1 | 12/2010 | Kimmel |
| 2010/0325155 A1 | 12/2010 | Skinner et al. |
| 2010/0331059 A1 | 12/2010 | Apgar et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0037721 A1 | 2/2011 | Cranfill et al. |
| 2011/0043990 A1 | 2/2011 | Mickey et al. |
| 2011/0044582 A1 | 2/2011 | Travis et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102356 A1 | 5/2011 | Kemppinen et al. |
| 2011/0115747 A1 | 5/2011 | Powell et al. |
| 2011/0134032 A1 | 6/2011 | Chiu et al. |
| 2011/0134112 A1 | 6/2011 | Koh et al. |
| 2011/0163955 A1 | 7/2011 | Nasiri et al. |
| 2011/0164370 A1 | 7/2011 | McClure et al. |

(56) References Cited

U.S. PATENT DOCUMENTS

| | | |
|---|---|---|
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0193938 A1 | 8/2011 | Oderwald et al. |
| 2011/0202878 A1 | 8/2011 | Park et al. |
| 2011/0205372 A1 | 8/2011 | Miramontes |
| 2011/0216266 A1 | 9/2011 | Travis |
| 2011/0227913 A1 | 9/2011 | Hyndman |
| 2011/0242138 A1 | 10/2011 | Tribble |
| 2011/0242298 A1 | 10/2011 | Bathiche et al. |
| 2011/0248152 A1 | 10/2011 | Svajda et al. |
| 2011/0248920 A1 | 10/2011 | Larsen |
| 2011/0261083 A1 | 10/2011 | Wilson |
| 2011/0273475 A1 | 11/2011 | Herz et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0304577 A1 | 12/2011 | Brown et al. |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0019165 A1* | 1/2012 | Igaki et al. .................. 315/294 |
| 2012/0020112 A1 | 1/2012 | Fisher et al. |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0075249 A1 | 3/2012 | Hoch |
| 2012/0081316 A1 | 4/2012 | Sirpal et al. |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0117409 A1 | 5/2012 | Lee et al. |
| 2012/0127118 A1 | 5/2012 | Nolting et al. |
| 2012/0127573 A1 | 5/2012 | Robinson et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0182242 A1 | 7/2012 | Lindahl et al. |
| 2012/0188791 A1 | 7/2012 | Voloschenko et al. |
| 2012/0194448 A1 | 8/2012 | Rothkopf |
| 2012/0195063 A1 | 8/2012 | Kim et al. |
| 2012/0200802 A1 | 8/2012 | Large |
| 2012/0206937 A1 | 8/2012 | Travis et al. |
| 2012/0224073 A1 | 9/2012 | Miyahara |
| 2012/0229634 A1 | 9/2012 | Laett et al. |
| 2012/0246377 A1 | 9/2012 | Bhesania |
| 2012/0256959 A1 | 10/2012 | Ye et al. |
| 2012/0274811 A1 | 11/2012 | Bakin |
| 2012/0300275 A1 | 11/2012 | Vilardell et al. |
| 2013/0063873 A1 | 3/2013 | Wodrich et al. |
| 2013/0076617 A1 | 3/2013 | Csaszar et al. |
| 2013/0106766 A1 | 5/2013 | Yilmaz et al. |
| 2013/0120466 A1 | 5/2013 | Chen et al. |
| 2013/0127980 A1 | 5/2013 | Haddick et al. |
| 2013/0155723 A1 | 6/2013 | Coleman |
| 2013/0172906 A1 | 7/2013 | Olson et al. |
| 2013/0182246 A1 | 7/2013 | Tanase |
| 2013/0207937 A1 | 8/2013 | Lutian |
| 2013/0229335 A1 | 9/2013 | Whitman |
| 2013/0232280 A1 | 9/2013 | Perek |
| 2013/0308339 A1 | 11/2013 | Woodgate et al. |
| 2013/0335387 A1 | 12/2013 | Emerton |
| 2014/0012401 A1 | 1/2014 | Perek |
| 2014/0043275 A1 | 2/2014 | Whitman |
| 2014/0063198 A1 | 3/2014 | Boulanger |

FOREIGN PATENT DOCUMENTS

| | | |
|---|---|---|
| JP | H0980354 | 3/1997 |
| JP | H09178949 | 7/1997 |
| JP | H10234057 | 9/1998 |
| JP | 10326124 | 12/1998 |
| JP | 2000106021 | 4/2000 |
| JP | 2002100226 | 4/2002 |
| JP | 2002162912 | 6/2002 |
| JP | 2003215349 | 7/2003 |
| JP | 2004171948 | 6/2004 |
| JP | 2005077437 | 3/2005 |
| JP | 2005156932 | 5/2005 |
| JP | 2005331565 | 12/2005 |
| JP | 2006004877 | 1/2006 |
| JP | 2006278251 | 10/2006 |
| JP | 2006294361 | 10/2006 |
| JP | 2006310269 | 11/2006 |
| JP | 2007184286 | 7/2007 |
| JP | 2007273288 | 10/2007 |
| JP | 2008529251 | 7/2008 |
| JP | 2009059583 | 3/2009 |
| KR | 20010039013 | 5/2001 |
| KR | 20080009490 | 1/2008 |
| KR | 20080055051 | 6/2008 |
| WO | WO-0128309 | 4/2001 |
| WO | WO-0172037 | 9/2001 |
| WO | WO-0348635 | 6/2003 |
| WO | WO-03083530 | 9/2003 |
| WO | WO-2005059874 | 6/2005 |
| WO | WO-2006044818 | 4/2006 |
| WO | WO-2006082444 | 8/2006 |
| WO | WO-2007094304 | 8/2007 |
| WO | WO-2007123202 | 11/2007 |
| WO | WO-2008013146 | 1/2008 |
| WO | WO-2008038016 | 4/2008 |
| WO | WO-2013033274 | 3/2013 |
| WO | WO-2013163347 | 10/2013 |

OTHER PUBLICATIONS

"ACPI Docking for Windows Operating Systems", Retrieved from: <http://www.scritube.com/limba/engleza/software/ACPI-Docking-for-Windows-Opera331824193.php> on Jul. 6, 2012,10 pages.

"Cholesteric Liquid Crystal", Retrieved from: <http://en.wikipedia.org/wiki/Cholesteric_liquid_crystal> on Aug. 6, 2012,(Jun. 10, 2012), 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, 1 page.

"Developing Next-Generation Human Interfaces using Capacitive and Infrared Proximity Sensing", *Silicon Laboratories, Inc.*, Available at <http://www.silabs.com/pages/DownloadDoc.aspx?FILEURL=support%20documents/technicaldocs/capacitive%20and%20proximity%20sensing_wp.pdf&src=SearchResults>,(Aug. 30, 2010), pp. 1-10.

"Directional Backlighting for Display Panels", U.S. Appl. No. 13/021,448, (Feb. 4, 2011), 38 pages.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, 4 pages.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"How to Use the iPad's Onscreen Keyboard", Retrieved from <http://www.dummies.com/how-to/content/how-to-use-the-ipads-onscreen-board.html> on Aug. 28, 2012, 3 pages.

(56) References Cited

OTHER PUBLICATIONS

"i-Interactor electronic pen", Retrieved from: <http://www.alibaba.com/product-gs/331004878/i_Interactor_electronic_pen.html> on Jun. 19, 2012, 5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

"Motion Sensors", *Android Developers*, retrieved from <http://developer.android.com/guide/topics/sensors/sensors_motion.html> on May 25, 2012, 7 pages.

"MPC Fly Music Production Controller", *AKAI Professional*, <http://www.akaiprompc.com/mpc-fly> Retrieved from: on Jul. 9, 2012, 4 pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/021,448, (Dec. 13, 2012), 9 pages.

"Non-Final Office Action", U.S. Appl. No. 13/471,001, (Feb. 19, 2013),15 pages.

"Non-Final Office Action", U.S. Appl. No. 13/471,139, (Mar. 21, 2013),12 pages.

"Non-Final Office Action", U.S. Appl. No. 13/471,202, (Feb. 11, 2013),10 pages.

"Non-Final Office Action", U.S. Appl. No. 13/471,336, (Jan. 18, 2013),14 pages.

"Non-Final Office Action", U.S. Appl. No. 13/651,195, (Jan. 2, 2013),14 pages.

"Non-Final Office Action", U.S. Appl. No. 13/651,232, (Jan. 17, 2013),15 pages.

"Non-Final Office Action", U.S. Appl. No. 13/651,272, (Feb. 12, 2013),10 pages.

"Non-Final Office Action", U.S. Appl. No. 13/651,287, (Jan. 29, 2013),13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013),14 pages.

"Non-Final Office Action", U.S. Appl. No. 13/651,976, (Feb. 22, 2013),16 pages.

"Non-Final Office Action", U.S. Appl. No. 13/653,321, (Feb. 1, 2013),13 pages.

"Non-Final Office Action", U.S. Appl. No. 13/653,682, (Feb. 7, 2013),11 pages.

"Notice of Allowance", U.S. Appl. No. 13/470,633, (Mar. 22, 2013), 7 pages.

"On-Screen Keyboard for Windows 7, Vista, XP with Touchscreen", Retrieved from <www.comfort-software.com/on-screen-keyboard.html> on Aug. 28, 2012, (Feb. 2, 2011), 3 pages.

"Optical Sensors in Smart Mobile Devices", *ON Semiconductor, TND415/D*, Available at <http://www.onsemi.jp/pub_link/Collateral/TND415-D.PDF>,(Nov. 2010), pp. 1-13.

"Optics for Displays: Waveguide-based Wedge Creates Collimated Display Backlight", *OptoIQ*, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010,(Jan. 1, 2010), 3 pages.

"Position Sensors", *Android Developers*, retrieved from <http://developer.android.com/guide/topics/sensors/sensors_position.html> on May 25, 2012, 5 pages.

"Reflex LCD Writing Tablets", retrieved from <http://www.kentdisplays.com/products/lcdwritingtablets.html> on Jun. 27, 2012, 3 pages.

"Restriction Requirement", U.S. Appl. No. 13/471,139, (Jan. 17, 2013), 7 pages.

"Restriction Requirement", U.S. Appl. No. 13/651,304, (Jan. 18, 2013), 7 pages.

"Restriction Requirement", U.S. Appl. No. 13/651,726, (Feb. 22, 2013), 6 pages.

"Restriction Requirement", U.S. Appl. No. 13/651,871, (Feb. 7, 2013),6 pages.

"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.

"SoIRxTM E-Series Multidirectional Phototherapy ExpandableTM 2-Bulb Full Body Panel System", Retrieved from: <http://www.solarcsystems.com/us_multidirectional_uv_light_therapy_1_intro.html> on Jul. 25, 2012,(2011), 4 pages.

"The Microsoft Surface Tablets Comes With Impressive Design and Specs", Retrieved from <http://microsofttabletreview.com/the-microsoft-surface-tablets-comes-with-impressive-design-and-specs> on Jan. 20, 2013, (Jun. 2012), 2 pages.

"Tilt Shift Lenses: Perspective Control", retrieved from http://www.cambridgeincolour.com/tutorials/tilt-shift-lenses1.htm, (Mar. 28, 2008),11 Pages.

"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.

"What is Active Alignment?", http://www.kasalis.com/active_alignment.html, retrieved on Nov. 22, 2012, 2 Pages.

Block, Steve et al., "DevceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages.

Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.

Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.

Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.

Das, Apurba et al., "Study of Heat Transfer through Multilayer Clothing Assemblies: A Theoretical Prediction", Retrieved from <http://www.autexrj.com/cms/zalaczone_pliki/5_013_11.pdf>, (Jun. 2011), 7 pages.

Dietz, Paul H., et al., "A Practical Pressure Sensitive Computer Keyboard", In Proceedings of UIST 2009,(Oct. 2009), 4 pages.

Gayer, William W., et al., "A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012,(May 7, 1995), 9 pages.

Glatt, Jeff "Channel and Key Pressure (Aftertouch).", Retrieved from: <http://home.roadrunner.com/~jgglatt/tutr/touch.htm> on Jun. 11, 2012, 2 pages.

Hanlon, Mike "ElekTex Smart Fabric Keyboard Goes Wireless", Retrieved from: <http://www.gizmag.com/go/5048/ > on May 7, 2012,(Jan. 15, 2006), 5 pages.

Harada, Susumu et al., "VoiceDraw: A Hands-Free Voice-Driven Drawing Application for People With Motor Impairments", *In Proceedings of Ninth International ACM SIGACCESS Conference on Computers and Accessibility*, retrieved from <http://citeseerx.ist.psu.edu/viewdoc/download?doi=10.1.1.113.7211&rep=rep1&type=pdf> on Jun. 1, 2012,(Oct. 15, 2007), 8 pages.

Iwase, Eiji "Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: *Journal of Microelectromechanical Systems*, (Dec. 2005), 7 pages.

(56) References Cited

OTHER PUBLICATIONS

Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
Manresa-Yee, Cristina et al., "Experiences Using a Hands-Free Interface", *In Proceedings of the 10th International ACM SIGACCESS Conference on Computers and Accessibility*, retrieved from <http://dmi.uib.es/~cmanresay/Research/%5BMan08%5DAssets08.pdf> on Jun. 1, 2012,(Oct. 13, 2008), pp. 261-262.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.
Nakanishi, Hideyuki et al., "Movable Cameras Enhance Social Telepresence in Media Spaces", *In Proceedings of the 27th International Conference on Human Factors in Computing Systems*, retrieved from <http://smg.ams.eng.osaka-u.ac.jp/~nakanishi/hnp_2009_chi.pdf> on Jun. 1, 2012,(Apr. 6, 2009),10 pages.
Piltch, Avram "ASUS Eee Pad Slider SL101 Review", Retrieved from <http://www.laptopmag.com/review/tablets/asus-eee-pad-slider-s1101.aspx>, (Sep. 22, 2011), 5 pages.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.
Qin, Yongqiang et al., "pPen: Enabling Authenticated Pen and Touch Interaction on Tabletop Surfaces", *In Proceedings of ITS 2010*, Available at <http://www.dfki.de/its2010/papers/pdf/po172.pdf>,(Nov. 2010), pp. 283-284.
Reilink, Rob et al., "Endoscopic Camera Control by Head Movements for Thoracic Surgery", *In Proceedings of 3rd IEEE RAS & EMBS International Conference of Biomedical Robotics and Biomechatronics*, retrieved from <http://doc.utwente.nl/74929/1/biorob_online.pdf> on Jun. 1, 2012,(Sep. 26, 2010), pp. 510-515.
Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.
Sundstedt, Veronica "Gazing at Games: Using in Eye Tracking to Control Virtual Characters", *In ACM SIGGRAPH 2010 Courses*, retrieved from <http://www.tobii.com/Global/Analysis/Training/EyeTrackAwards/veronica_sundstedt.pdf> on Jun. 1, 2012,(Jul. 28, 2010), 85 pages.
Takamatsu, Seiichi et al., "Flexible Fabric Keyboard with Conductive Polymer-Coated Fibers", In Proceedings of Sensors 2011,(Oct. 28, 2011), 4 pages.
Travis, Adrian et al., "Collimated Light from a Waveguide for a Display Backlight", *Optics Express*, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009, 6 pages.
Travis, Adrian et al., "The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010, 4 pages.

Valliath, G T., "Design of Hologram for Brightness Enhancement in Color LCDs", Retrieved from <http://www.loreti.it/Download/PDF/LCD/44_05.pdf> on Sep. 17, 2012, 5 pages.
Vaucelle, Cati "Scopemate, A Robotic Microscope!", *Architectradure*, retrieved from <http://architectradure.blogspot.com/2011/10/at-uist-this-monday-scopemate-robotic.html> on Jun. 6, 2012,(Oct. 17, 2011), 2 pages.
Williams, Jim "A Fourth Generation of LCD Backlight Technology", Retrieved from <http://cds.linear.com/docs/Application%20Note/an65f.pdf>, (Nov. 1995),124 pages.
Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.
Zhu, Dingyun et al., "Keyboard before Head Tracking Depresses User Success in Remote Camera Control", *In Proceedings of 12th IFIP TC 13 International Conference on Human-Computer Interaction, Part II*, retrieved from <http://csiro.academia.edu/Departments/CSIRO_ICT_Centre/Papers?page=5> on Jun. 1, 2012,(Aug. 24, 2009),14 pages.
"Non-Final Office Action", U.S. Appl. No. 13/021,448, (Aug. 16, 2013), 25 pages.
"Non-Final Office Action", U.S. Appl. No. 13/371,725, (Nov. 7, 2013),19 pages.
Kim et al.,"A Controllable Viewing Angle LCD with an Optically isotropic liquid crystal", Journal of Physics D: Applied Physics, vol. 43, No. 14, Mar. 23, 2010, 7 Pages.
Travis et al.,"Flat Projection for 3-D", In Proceedings of the IEEE, vol. 94 Issue: 3,Available at <http://ieeexplore.ieee.org/stamp/stamp.jsp?tp=&arnumber=1605201>, Mar. 13, 2006, pp. 539-549.
C.M.G."Flat-panel Backlight for View-sequential 3D Display", Optoelectronics, IEE Proceedings-.vol. 151. No. 6 IET, Dec. 2004, 4 pages.
"International Search Report", Application No. PCT/US2010/045676, Apr. 28, 2011, 2 Pages.
"International Search Report", Application No. PCT/US2010/046129, Mar. 2, 2011, 3 Pages.
"International Search Report and Written Opinion", Application No. PCT/US2013/043961, Oct. 17, 2013, 11 pages.
"International Search Report and Written Opinion", Application No. PCT/US2013/055679, Nov. 18, 2013, 8 pages.
Travis et al.,"P-127: Linearity in Flat Panel Wedge Projection", SID 03 Digest, retrieved from <http://www2.eng.cam.ac.uk/~arlt1/Linearity%20in%20flat%20panel%20wedge%20projection.pdf>, May 12, 2005, pp. 716-719.
"Real-Time Television Content Platform", retrieved from <http://www.accenture.com/us-en/pages/insight-real-time-television-platform.aspx> on Mar. 10, 2011, May 28, 2002, 3 pages.
Yagi "The Concept of "AdapTV"", Series: The Challenge of "AdapTV", Broadcast Technology, No. 28, 2006, pp. 16-17.
"What is the PD-Net Project About?", retrieved from <http://pd-net.org/about/> on Mar. 10, 2011, 3 pages.
Xu, et al., "Hand Gesture Recognition and Virtual Game Control Based on 3D Accelerometer and EMG Sensors", Retrieved at <<http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf>>, IUI, Feb. 8-11, 2009, pp. 5.
Kaufmann, et al., "Hand posture recognition using real-time artificial evolution", Retrieved at <<http://evelyne.lutton.free.fr/Papers/KaufmannEvolASP2010.pdf>>, EvoApplications, Apr. 3, 2010, pp. 251-260.
Xu, et al., "Vision-based Detection of Dynamic Gesture", Retrieved at <<http://ieeexplore.ieee.org/stamp/stamp.jsp?tp=&arnumber=5412956, ICTM, Dec. 5-6, 2009, pp. 223-226.
Valli, Alessandro, "Notes on Natural Interaction", Retrieved at <<http://www.idemployee.id.tuesil/g.w.m.rauterberg/lecturenotes/valli-2004.pdf, Sep. 2005, pp. 80.
"Final Office Action", U.S. Appl. No. 13/651,195, (Apr. 18, 2013),13 pages.
"Notice of Allowance", U.S. Appl. No. 13/471,202, (May 28, 2013), 7 pages.
"Notice of Allowance", U.S. Appl. No. 13/651,195, (Jul. 8, 2013), 9 pages.

(56) References Cited

OTHER PUBLICATIONS

"Final Office Action", U.S. Appl. No. 13/021,448, Jan. 16, 2014, 33 Pages.
"Final Office Action", U.S. Appl. No. 13/371,725, Apr. 2, 2014, 22 pages.
"Final Office Action", U.S. Appl. No. 13/525,070, Apr. 24, 2014, 21 pages.
"Non-Final Office Action", U.S. Appl. No. 13/525,070, Jan. 17, 2014, 19 pages.
"International Search Report and Written Opinion", Application No. PCT/US2013/028488, Jun. 24, 2014, 11 pages.
"Non-Final Office Action", U.S. Appl. No. 13/525,070, Aug. 14, 2014, 24 pages.
"Notice of Allowance", U.S. Appl. No. 14/018,286, May 23, 2014, 8 pages.
"Supplemental Notice of Allowance", U.S. Appl. No. 14/018,286, Jun. 11, 2014, 5 pages.
"EP Search Report", EP Application No. 09812072.8, Apr. 5, 2012, 6 Pages.
"Foreign Office Action", CN Application No. 200980134848, May 13, 2013, 7 Pages.
"Foreign Office Action", CN Application No. 200980134848, May 31, 2012, 7 Pages.
"Foreign Office Action", CN Application No. 200980134848, Dec. 4, 2013, 8 Pages.
"Foreign Office Action", CN Application No. 200980134848, Dec. 19, 2012, 8 Pages.
"Foreign Office Action", CN Application No. 201080037117.7, Jul. 1, 2014, 9 Pages.
"Foreign Office Action", CN Application No. 201210023945.6, Jun. 25, 2014, 6 Pages.
"Foreign Office Action", JP Application No. 2011-526118, Aug. 16, 2013, 8 Pages.
"Foreign Office Action", JP Application No. 2012-525632, 05/02/14, 10 Pages.
"Foreign Office Action", JP Application No. 2012-525722, Apr. 22, 2014, 15 pages.
"International Search Report and Written Opinion", Application No. PCT/US2009/055250, Mar. 2, 2014, 10 Pages.
"Non-Final Office Action", U.S. Appl. No. 13/021,448, Jul. 22, 2014, 35 pages.
"Search Report", EP Application No. 09812072.8, Apr. 17, 2013, 5 Pages.
Boual, et al., "Wedge Displays as Cameras", Retrieved From: http://www.camfpd.com/72-3.pdf, SID Symposium Digest of Technical Papers, vol. 37, Issue 1, pp. 1999-2002, Jun. 2006, 4 Pages.
Chen, et al., "Design of a Novel Hybrid Light Guide Plate for Viewing Angle Switchable Backlight Module", Institute of Photonic Systems, Ntional Chiao Tung University, Tainan, Taiwan., Jul. 1, 2013, 4 Pages.
Chou, et al., "Imaging and Chromatic Behavior Analysis of a Wedge-Plate Display", Retrieved From: http://www.di.nctu.edu.tw/2006TDC/papers/Flexible/06-012.doc, SID Symposium Digest of Technical Papers vol. 37, Issue 1, pp. 1031-1034, Jun. 2006, 4 Pages.
Ishida, et al., "A Novel Ultra Thin Backlight System without Optical Sheets Using a Newly Developed Multi-Layered Light-guide", SID 10 Digest, Jul. 5, 2012, 4 Pages.
Nishizawa, et al., "Investigation of Novel Diffuser Films for 2D Light-Distribution Control", Tohoku University, Aramaki Aoba, Aoba-ku, Sendai 980-8579, Japan, LINTEC Corporation, 23-23 Honcho, Itabashi-ku, Tokyo 173-0001, Japan., Dec. 2011, 4 Pages.
Phillips, et al., "Links Between Holography and Lithography", Fifth International Symposium on Display Holography, 206., Feb. 17, 1995, 9 Pages.
Powell, "High-Efficiency Projection Screen", U.S. Appl. No. 14/243,501, filed Apr. 2, 2014, 26 Pages.
Travis, "P-60: LCD Smear Elimination by Scanning Ray Angle into a Light Guide", Retrieved From: http://www2.eng.cam.ac.uk/~arlt1/P_60.pdf, SID Symposium Digest of Technical Papers vol. 35, Issue 1, pp. 474-477, May 2004, 4 Pages.
Travis, et al., "Optical Design of a Flat Panel Projection Wedge Display", 9th International Display Workshops, paper FMC6-3, Dec. 4-6, 2002, Hiroshima, Japan., Dec. 2002, 4 Pages.
"Non-Final Office Action", U.S. Appl. No. 13/371,725, Nov. 3, 2014, 27 pages.

\* cited by examiner

US 8,947,353 B2

PHOTOSENSOR ARRAY GESTURE DETECTION

BACKGROUND

One of the challenges that faces designers of devices having user-engageable displays, such as touchscreen displays, pertains to providing enhanced functionality for users, through gestures that can be employed with the devices. This is so, not only with devices having larger or multiple screens, but also in the context of devices having a smaller footprint, such as tablet PCs, hand-held devices, mobile phone, smaller multi-screen devices and the like.

Due in part to the small size of some devices and touchscreens, the types and number "on-screen" gestures (e.g., gestures applied to a touchscreen) that can be provided by a particular device may be limited. Moreover, on-screen gestures may interfere with content presentations in some contexts, such as by occluding a video presentation or a portion of digital book a user is viewing. Alternative techniques such as camera-based tracking and gestures may be impracticable or cost prohibitive for some devices. Accordingly, traditional touch gestures and input techniques may limit users and/or may be insufficient in some scenarios, use cases, or specific contexts of use.

SUMMARY

Photosensor array gesture detection techniques are described. In one or more embodiments, a computing device includes an array of photosensors. The photosensor array can be configured in various ways to measure changes in the amount of light that occur based upon a user's hand position above the photosensor array. In at least some embodiments, capacitance associated with the photosensors is charged and data regarding discharge rates for the sensors is collected that is indicative of the amount of incident light. Sequential changes in the amount of light that is measured across the array of photosensors can be used to determine positioning and/or movement of the user's hand in three dimensions (e.g., track position/motion in three-dimensional (3D) space relative to the computing device.) Accordingly, various gestures can be defined in terms of input obtained via the photosensor array and recognized to trigger corresponding operations by the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Existing techniques for above surface gesture techniques may be complicated and expensive. For instance, camera-based visual tracking techniques may be impracticable for small devices, are relatively expensive, and/or may consume considerable processing, memory, and power resources.

Photosensor array gesture detection techniques are described. In one or more embodiments, a computing device includes an array of photosensors. The photosensor array can be configured in various ways to measure changes in the amount of light that occur based upon a user's hand position above the photosensor array. In at least some embodiments, capacitance associated with the photosensors is charged and data regarding discharge rates for the sensors is collected that is indicative of the amount of incident light. Sequential changes in the amount of light that is measured across the array of photosensors can be used to determine positioning and/or movement of the user's hand in three dimensions (e.g., track position/motion in three-dimensional (3D) space relative to the computing device.) Accordingly, various gestures can be defined in terms of input obtained via the photosensor array and recognized to trigger corresponding operations by the computing device.

In the following discussion, an example environment is first described that is operable to employ the photosensor array gesture detection techniques described herein. Example procedures are then described, which may be employed in the example environment, as well as in other environments. Accordingly, the example devices and procedures are not limited to the example environment and the example environment may incorporate devices and procedures in addition to the examples described herein. Lastly, an example computing system is described that can be employed to implement photosensor array gesture detection techniques in one or more embodiments.

Operating Environment

Figure 1:
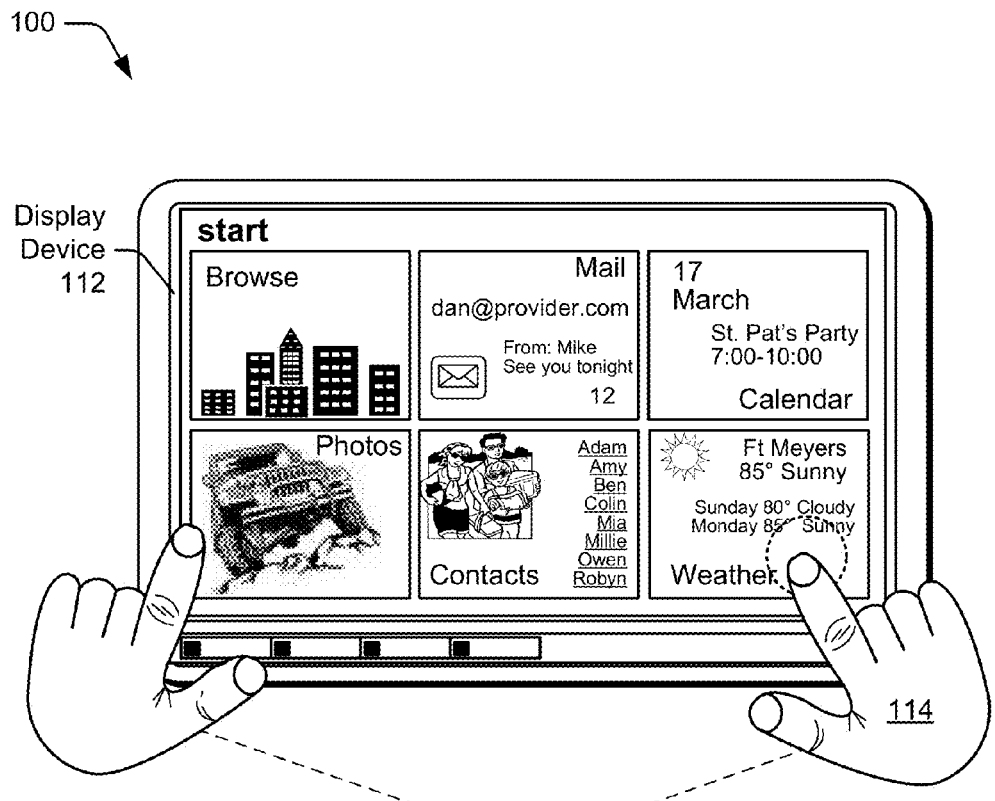
FIG. 1 is an illustration of an example implementation of an environment that is operable to employ photosensor array gesture detection techniques described herein.
Figure 1:
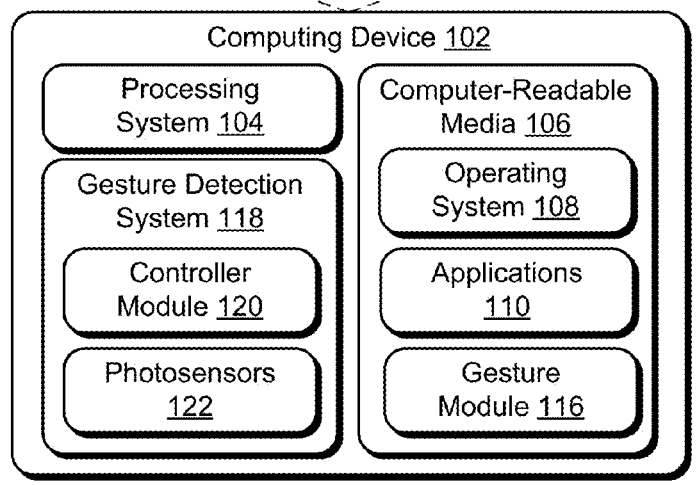

FIG. 1 is an illustration of an example operating environment 100 that is operable to employ the techniques described herein. The operating environment includes a computing device 102 having a processing system 104 and computer-readable media 106 that is representative of various different types and combinations of media, memory, and storage components and/or devices that may be associated with a computing device. The computing device 102 is further illustrated as including an operating system 108 and one or more applications 110 that may reside on the computer-readable media (as shown), may be implemented at least partially by one or more hardware elements, and/or may be executed via the processing system 104. Computer-readable media 106 may include both "computer-readable storage media" and "communication media," examples of which can be found in the discussion of the example computing system of FIG. 7. The computing device 102 may be configured as any suitable computing system and/or device that employ various processing systems 104 examples of which are also discussed in relation to the example computing system of FIG. 7.

In the depicted example, the computing device 102 includes a display device 112 that may be configured as a touchscreen to enable touchscreen and gesture functionality based on positioning and motion of a user's hand 114. The applications 110 may include a display driver, a gesture module 116, and/or other modules operable to provide touchscreen and gesture functionality enabled by the display device 112. Accordingly, the computing device may be configured to recognize input and gestures that cause corresponding operations to be performed.

For example, a gesture module 116 may be configured to recognize a touch input, such as a finger of a user's hand 114 as on or proximate to the display device 112 of the computing device 102 using touchscreen functionality. The gesture module 116 also represents functionality for recognition and handling of gestures based on input and data collected via a suitable photosensor array as described herein. Thus, a variety of different types of gestures may be recognized by the computing device including, by way of example and not limitation, gestures that are recognized from a single type of input (e.g., touch gestures), gestures involving multiple types of inputs, touch gestures applied to display device 112, above surface gestures based on movement in a three-dimensional (3D) space that extends out from the display surface, and so forth. For example, the gesture module 116 can be utilized to recognize single-finger gestures and bezel gestures, multiple-finger/same-hand gestures and bezel gestures, and/or multiple-finger/different-hand gestures and bezel gestures. Further, the computing device 102 may be configured to detect and differentiate between photosensor array input/gestures, touchscreen inputs, stylus input, camera-based vision tracking gestures, and other different types of inputs. Moreover, various kinds of inputs obtained from different sources, including the photosensor array gestures, touch inputs, stylus input, above surface gestures, and/or inputs obtained through a mouse, touchpad, software or hardware keyboard, and/or hardware keys of a device (e.g., input devices), may be used in combination to cause corresponding device operations.

To implement photosensor array gesture detection techniques, the computing device 102 may further include a gesture detection system 118 that includes or otherwise makes uses of a controller module 120 and a plurality of photosensors 122. The gesture detection system 118 represent functionality operable to obtain and use various input from the photosensors 122 that is indicative of "above surface" gestures supported by the gesture detection system 118. Generally speaking, the gesture detection system 118 employs an array of photosensors 122 to measure changes in light that occur as a user positions and moves their hand above the display device 112. For instance, the controller module 120 may selectively operate the photosensors 122 in different modes to collect data regarding the amount of light incident upon the photosensors 122. Changes in light levels may occur based on the amount of ambient light that is reflected or blocked when a user moves their hand above the display and/or tilts the device. Changes in the amount of incident light upon the photosensors 122 may be used to assess positioning and/or movement of a user's hand(s) as wells as to sense tilt of the device. Various above surface gestures may be defined to correspond to particular patterns or sequences of light changes and hand movements relative to the array of sensors. Thus, detection of particular patterns or sequences of light changes can be correlated to gestures and used to drive computing operations.

The controller module 120 may be implemented to provide logic to control operation of the photosensors 122 and process input that is received through the photosensors 122. For example, the controller module 120 may represent a microcontroller and/or other hardware used to control an array of photosensors 122. Functionality of the controller module 120 may alternatively be implemented at least partially as software that is executed by the processing system 104. The controller module 120 may also be further configured to supply input data that is collected from the photosensors 122 to the gesture module 116 to recognize various gestures and cause corresponding actions. A suitable photosensor array may be implemented and arranged in various ways, examples of which are discussed in relation to the following figures.

Above surface gestures as used herein refer to gestures in a three dimensional (3D) space extending out from the computing device and/or display surface (e.g., gestures made at some distance above, in front of, or otherwise away from the display surface). Such above surface gestures can occur without touch-input, near-surface capacitive touch, and/or contact with the display device 112. Recognition of above surface gestures through a photosensor array is therefore distinguishable from recognition of touchscreen input/gestures (e.g., "on-screen" gestures) applied to a display device 112 as discussed above. Moreover, using an array of photosensors 122 provides a relatively inexpensive and straightforward way to detect gestures above the surface of a device in comparison to existing techniques. For instance, existing camera-based techniques that rely upon a depth detection camera and visual object tracking for above surface gesture detection are complex and consume considerable processing and/or battery power. Techniques that rely upon external input devices, such as hand-held or wearable devices, may prevent the user from freely using their hands and typically involve communication componentry and interactions between devices that can add cost and complicate processing. In contrast, the techniques to detect gestures described herein are not dependent upon manipulation by a user of or communication with external hand-held or wearable input devices. The photosensor array gesture detection techniques as described herein enable natural hands-free gestures and can avoid complexity and expense associated with existing techniques.

Having described an example operating environment, consider now a discussion of some example implementation details regarding a photosensor array suitable to implement techniques for photosensor array gesture detection in one or more embodiments.

Photosensor Array Details

Figure 2:
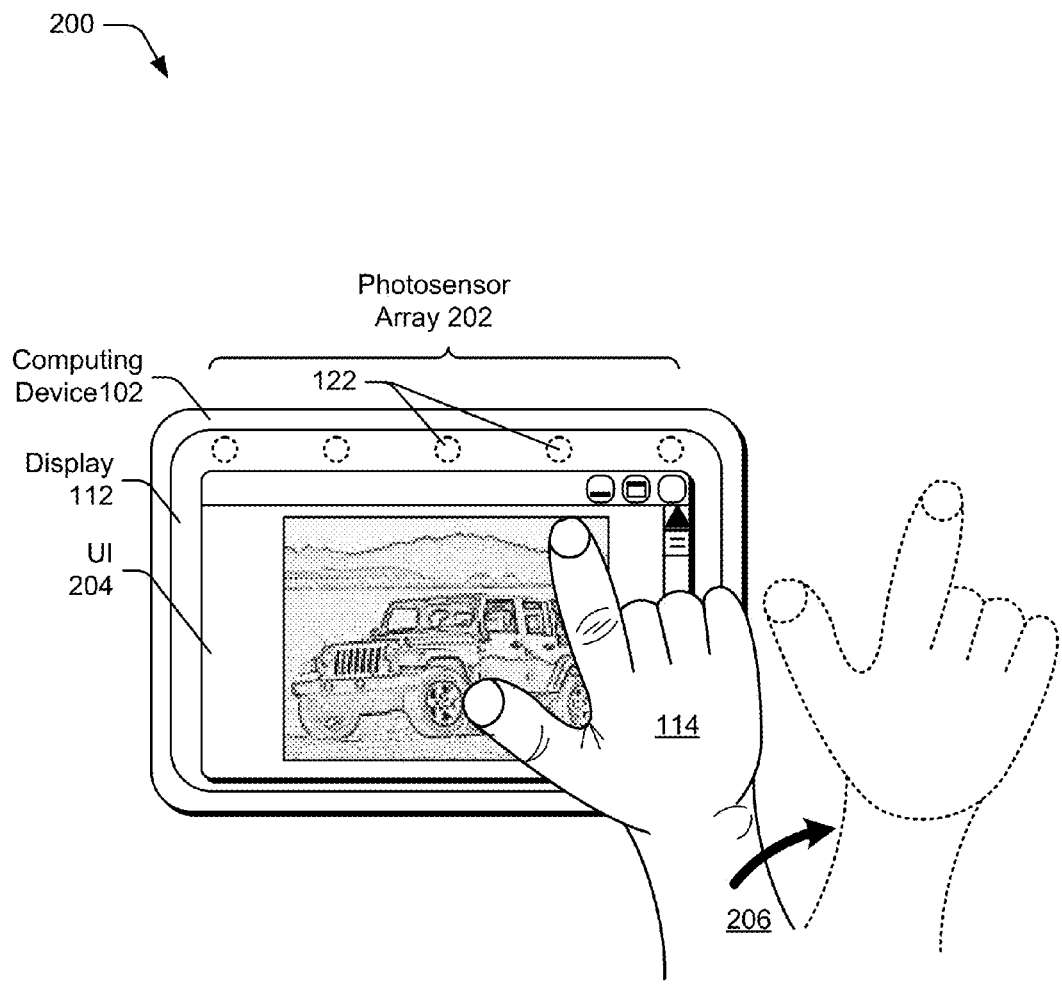
FIG. 2 depicts an example computing device that includes a photosensor array.
Figure 3:
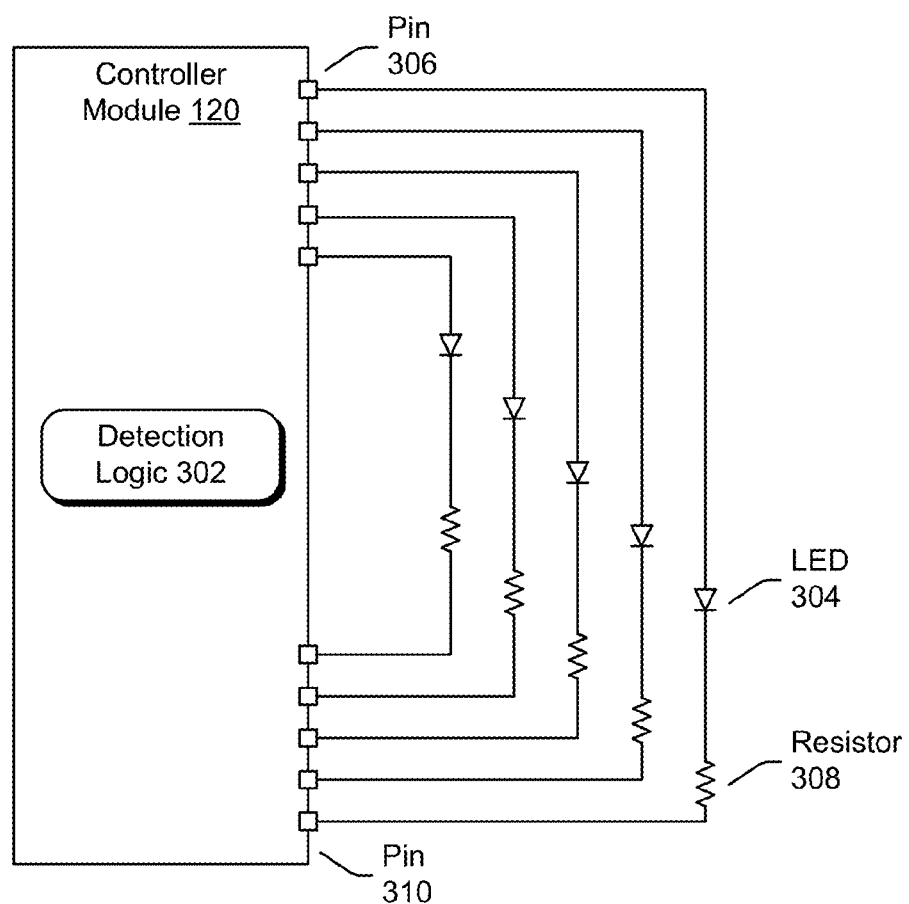
FIG. 3 depicts an example implementation of a circuit for a photosensor array of a gesture detection system.

In this section, details regarding a photosensor array are described in relation to example illustrations of FIG. 2 and FIG. 3. A photosensor array is generally configured to enable detection of gestures based upon user movement above/away from the display surface of a computing device. Such above surfaces gestures may be used in addition to, in lieu of, and/or in combination with other kinds of input including touchscreen input and input from various input devices.

In particular, FIG. 2 depicts generally at 200 an example computing device 102 of FIG. 1 that includes a photosensor array 202 having a plurality of photosensors 122. The plurality of photosensors 122 depicted may represent individual sensors and/or clusters of multiple sensors. The photosensor array 202 may be arranged in various ways and at different locations. For instance, the photosensor array 202 may be provided as an integrated component of the display device 112 (as depicted), as an arrangement of sensors embedded into a housing for the computing device 102, as a separate external device or removable add-on device that can be connected to the computing device 102 via a wired or wireless interface, and so forth. In particular, example photosensors 122 of the photosensor array 202 in FIG. 2 are depicted as being arranged linearly across the computing device/display. Other arrangements are also contemplated such as a uniform or non-uniform grid of sensors disposed throughout the display device 112, a staggered arrangement, or other pattern for a plurality of photosensors 122. Although five photosensors 122 are depicted in FIG. 2, the number of sensors for a photosensor array 202 may be different for various devices, displays, and/or arrangements. For example, the number of sensors (or sensor clusters) may range from just a few sensors (e.g., two to nine) to tens or even hundreds of sensors in different embodiments.

A variety of suitable photosensors 122 may be employed. In one approach, the photosensors are configured as light emitting diodes (LEDS) that operate as light detectors. As may be appreciated by those of skill in the art, LEDs may operate as light detectors by reverse biasing the LEDs such that the voltage at the cathode of an LED circuit is higher than at the anode of the LED circuit. This technique charges capacitance of the LEDs. Discharge rates for the capacitance of the LEDs can then be monitored and analyzed to correlate the discharge rates to light levels, user hand position/motion, and/or corresponding gestures. Further, LEDs may be cycled back and forth between light emitting and light detection modes at a rate that is imperceptible to the human eye. This enables selected LEDs of the display device 112 to be used to implement the photosensor array 202 as well as for display of content. Thus, existing LEDs or a display may be repurposed as photosensors and/or reconfigured to act as both light emitters and light detectors. Additionally or alternatively, LEDs or other sensors of the device or display may be configured as dedicated light detectors that are not employed for display of content. Adding or dedicating a relatively small number of LEDs integrated with a display as light detectors generally does not cause significant or user detectable issues with display of content via the display. Other kinds of photosensors 122 such as photodiodes, photovoltaic cells, photoresistors, and other photo sensitive light detection devices may be used in various embodiments. In at least some embodiments, the amount of photocurrent may be directly measured using suitably configured photosensors.

Gestures recognized via input from a photosensor array 202 may be employed to control interaction with the computing device 102 in different ways. For instance, a variety of gestures may be defined to control content that is presented via a user interface 204 on the display device 112. The gestures may be defined in terms of light level (e.g., photocurrent) changes and sequences of changes that are detectable via the photosensor array 202. By way of example and not limitation, gestures may be used to control navigation of content, content/menu selections, views of the user interface 204, and so forth. This may include operations such as turning pages of a digital book, bookmarking content, navigating a photo library or other media library, playing games, zooming in/out, cut and paste operations, rearrangements of icons or other content representations, menu item selections, navigation of operating system and application user interfaces, selecting/launching/closing and otherwise controlling execution of applications, and various other operations. In addition to detection of gestures, the photosensor array 202 may also be employed as a general motion detector, as a tilt sensor for a device based on changes across multiple sensors of the array, and/or to resolve positions of users (e.g., arms, hands, feet, fingers, etc.) as wells as objects (e.g., stylus, pointer, wand, etc.) in 3D space extending out from the array.

One particular example input scenario using the photosensor array 202 is depicted in FIG. 2. Here, a user's hand 114 is represented at 206 as making a waving motion generally from left to right across the upper right hand portion of the display. This waving motion may be defined as a gesture to manipulate the displayed user interface 204. In this example, the user interface 204 is configured as a picture viewer in which a vehicle picture is presented. In this scenario, the waving motion may cause navigation between various pictures in a folder or collection. Thus, the vehicle picture may be changed to another picture in the collection based on the waving motion. In other example scenarios, comparable gestures may correlate to navigation between open applications in an operating system interface, navigation between pages or tabs of a web browser, turning of pages of a digital book in a reading application and so forth. The example waving motion and other motions/positioning of the user's hand 114 cause the amount of light incident upon the photosensors 122 to change accordingly. The photosensors 122 may capture these changes as changes in photocurrent. Generally, the photocurrent that is measured decreases as a user passes their hand (or an object) over a photosensor and blocks ambient light from reaching the photosensor. A controller module 120 may be implemented by the gesture detection module 118 to analyze and interpret the photocurrent changes for individual sensors and/or across different sensors to recognize gestures and initiate corresponding actions. Additional details regarding these and other aspects of techniques for photosensor array gesture detection may be found in relation to the following figures.

FIG. 3 depicts generally at 300 an example implementation of a circuit for a photosensor array 202 of a gesture detection system 118. In this example, the circuit includes a controller module 120 in a hardware form to implement detection logic 302 for collecting, analyzing and/or interpreting input from the photo sensor array 202. The controller module 120 for example may be configured as microcontroller, such as a peripheral interface controller (PIC) microcontroller. Functionality of the controller module 120 and/or detection logic 302 may also be implemented at least partially via a processing system 104 of a device and/or software executed by the processing system 104. The example circuit of FIG. 3 includes five photosensors configured as LEDs 304. The LEDs 304 in the example circuit are each coupled to respective input/output (I/O) pins on the microcontroller and to a resistor. Specifically the anode side of each LED 304 is coupled to a respective anode pin 306 of the controller module 120. The cathode side of each LED 304 is coupled to a respective resistor 308 and a cathode pin 310. Although LEDs are depicted, other kinds of photosensors 122 may also be employed. For instance, photoresistors may be employed for embodiments in which the photosensors 122 are not configured for use as light emitters/light sources.

Naturally, a circuit may include more or less photosensors in comparable arrangements. Additional photosensors may be used to improve sensitivity of the array and/or to enable increased ability to sense motion/position in three-dimensions. For the purpose of this discussion a three-dimensional coordinate system may defined with x, y, and z axes relative to the array and device surface where an x-y plane is defined by the display surface and the z-axis extends outward from the surface and may define height above the surface. For instance, in one arrangement thirty-six photosensors may be disposed in an array across a display device. A variety of other example arrangements that employ different numbers of photosensors are also contemplated. The number of photosensors employed for various applications of the described techniques may depend upon considerations including cost, device/display size, complexity of supported gestures, power consumption, position of the array, and so forth.

In operation, the detection logic 302 is configured to selectively apply a charge (e.g., voltage) to the LEDs to charge capacitance of the LEDs, release the charge, and determine the amount of time it takes to discharge the LEDs. Longer discharge time corresponds to less photocurrent and less corresponding light being received at a particular photosensor. More generally, the detection logic 302 may cause measurement of the amount photocurrent through an array of photosensors over time in various ways. This may be based on the rate of capacitive discharge using LEDs, direct measurement of photocurrent with photodiodes or photoresistors, and so forth.

To charge capacitance of the LEDs, the detection logic 302 may operate to alternate the pins of the microcontroller between states. As mentioned, LEDs may be used as both light emitters and light detectors. In this approach, the detection logic 302 may cycle both the LED anodes and LED cathodes at a designated rate between output low and output high states for each pin. In this approach, the anode pins 306 and cathode pins 310 are driven alternately to opposite states. In another approach, the anode pins 306 may be connected to ground and the cathode pins 310 are cycled between high and low states.

In either of these cases, when the cathode side is in an output low state, the LEDs operate as light emitters. When the cathode side is in an output high state, the LEDs may operate as photosensors. Cycling quickly back and forth between the low and high states enables the same LEDS to alternate between emitting and sensing modes. A delay between different states enables collection of data regarding photocurrent by switching pins to an input mode. A cycle of the states including the delay may be configured to occur relatively quickly (e.g., within microseconds) so the alternating is not visually perceptible by a viewer.

In particular, when the cathode pins 310 are in a high output state, the LEDs work as capacitors in parallel with a current source which models optically induced photocurrent that can be measured as an indication of above surface gestures, motion and/or position. Cycling cathode pins 310 from low to high charges the capacitance. Then, the cathode pins 310 may be switched an input mode, which causes the photocurrent through the circuit to discharge the capacitance of the LEDs. Timing the amount of time is takes the capacitance of the LEDs to discharge down to a threshold level provides a measurement of the photocurrent and accordingly the amount of incident light associated with each of the LEDs. Discharge times may be computed in any suitable way. For example, the detection logic 302 may start timers to measure the time it takes for the LEDs to discharge. The times continue to run until the photosensor is discharged to a threshold level. With less photocurrent, it takes longer to discharge and accordingly the measured amount of time will be greater. Thus, timing data for discharge of each LED and each one of multiple cycles may be collected. In some embodiments, the timing data may be mapped to discrete light levels on a defined scale. For instance, a scale from one to ten may be defined to correlate discharge times and photocurrent measurements to defined light levels on the scale. The timing data and/or corresponding scale values may be stored as register values of the microcontroller associated with the LEDs, in a database, or otherwise.

Analysis of the collected timing data enables detection of gestures and other user interaction with a computing device 102. The timing data reflects the amount of light incident to particular photosensors. Thus, as a user positions and/or moves their hand over various photosensors, some ambient light may be blocked and time values may increase accordingly. Sequential changes and patterns in the timing data may be indicative of particular user action and may be correlated to defined gestures that trigger operations. Generally, patterns and sequential changes for individual sensors may be indicative of positioning and/or motion up/down relative to the array (e.g., in a z direction extending above the display surface). Changes across multiple sensors may be indicative of gestures and motions across the display (e.g., in x or y directions defined by the surface) For example, the hand waving gesture from left to right depicted in FIG. 2 may correlate to a sequential decrease in light level in order across the three sensors on the right hand side. Waving back and forth may be indicated by successive light level changes in opposite directions across the three sensors. Positioning of a user's hand over a particular sensor may be indicated by a decrease in light level that remains steady for a period of time. Subsequent changes in the light level for the particular sensor (or group of sensors) may indicate up/down movement of the users hand in the z direction, which could correlate to zooming out/in on an object or page. Thus, various patterns and changes can be detected based on collected timing data and used to drive corresponding operations.

Generally speaking, gestures are not instantaneous commands but are defined by a series of corresponding states, which in the context of this document are different states for sensors of the photosensor array. The gestures may be defined in terms of a beginning state and end state for the array and optionally one or more intermediate states. Waiting for detection of the end state to trigger operation may potentially introduce delay that may be visually perceived by a viewer. This may occur from example with animations associated with content navigation, such as picture viewing transitions and transitions for turning pages.

To handle this and minimize perceptible delay, operations for some gestures may be started in response to detection of a user's hand above the array at particular photosensors locations. The operations may then be completed when the full sequence of particular states matching a gesture are detected. The particular gesture/operations that are triggered may depend upon the interaction context. Consider, for example, a page turning animation in the context of user interaction with a digital book via a reader application. An initial sequence of the page turning animation may be initiated as soon as the user's hand is positioned and detected above an appropriate one of the sensors in the array. For example, a designated number of frames for the animation may be triggered based on detection of the initial position. This may give the appearance of a page wiggling, beginning to turn, or otherwise giving an indication that the page is ready for turning. The remaining frames of the animation may then be triggered upon the detection of states that match the page turning gesture. Here, the animation continues at a point after the designated number of frames so the page turning proceeds from where it left off. This technique can be employed to minimize or eliminate perceptive delay for some gestures and/or corresponding animations.

Having described some details regarding photosensor array gesture detection techniques, consider now some example procedures in accordance with one or more embodiments.

Example Procedures

The following discussion describes photosensor array gesture detection techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and examples of FIGS. 2 and 3, respectively. In at least some embodiments, the procedures may be performed by a suitably configured computing device, such as the example computing device 102 of FIG. 1 that includes or otherwise make use of a gesture detection system 118.

Figure 4:
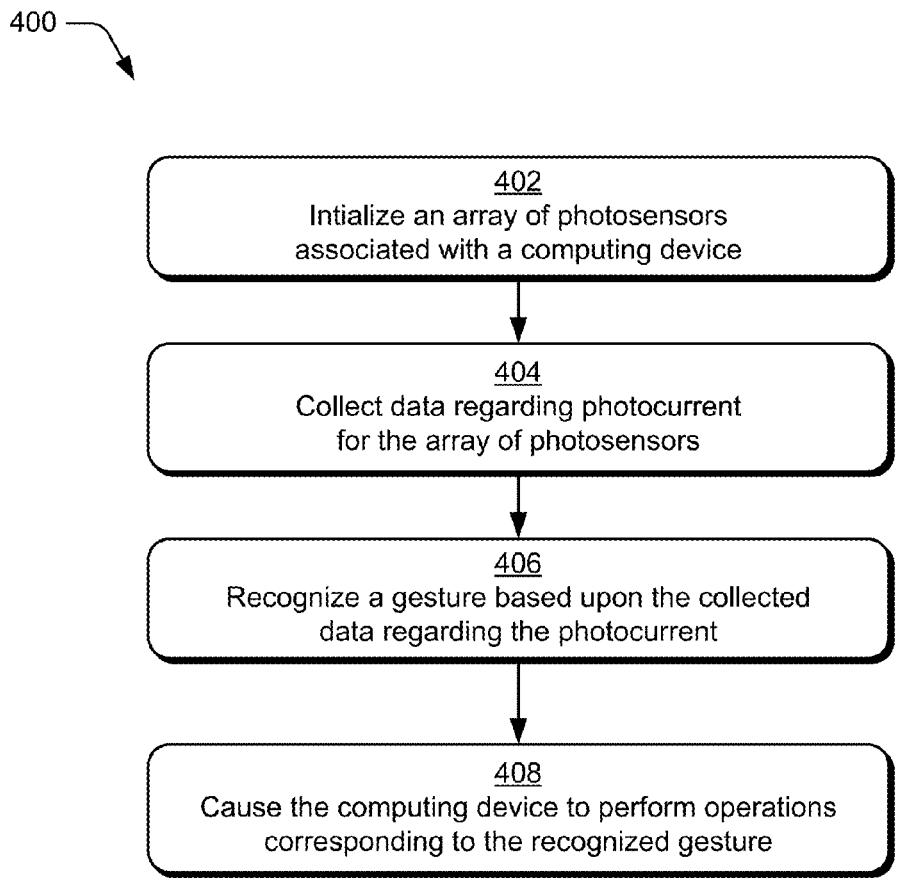
FIG. 4 is a flow diagram depicting an example procedure to recognize a gesture using a photosensor array in accordance with one or more embodiments.

FIG. 4 depicts an example procedure 400 to recognize a gesture using a photosensor array in accordance with one or more embodiments. An array of photosensors associated with a computing device is initialized (block 402). For example, a controller module 120 of a gesture detection system 118 may operate to initialize a photosensor array 202 in various ways to detect above surface gestures for a computing device. This may involve cycling a circuit to charge capacitance of a various photosensors 122 in the array as discussed previously. In addition or alternatively, voltage may be applied to photosensors 122 configured to measure photocurrent directly to prepare the photosensors 122 to obtain information regarding light incident to the photosensors 122. The photosensor array 202 may be provided as an integrated component of the computing device 102 or as a separate/removable component connectable to the computing device 102.

Data is collected regarding photocurrent for the array of photosensors (block 404). Here, the photosensor array 202 is used to collect data regarding the amount of light at the surface of the computing device 102. For instance, timing data regarding discharge rates for capacitance of an LED array may be collected as discussed previously. The timing data reflects photocurrent associated with particular sensors and therefore corresponding light levels. Photocurrent information may also be collected directly or indirectly via photodiodes, photoresistors, and/or other kinds of photosensors. The collected data may be stored in any suitable manner in an appropriate location accessible to supply the collected data for analysis.

A gesture is recognized based upon the collected data regarding the photocurrent (block 406). Gestures may be recognized in any suitable way based on data indicative of photocurrent that is collected. In particular, the controller module 120 may interact with a gesture module 116 to interpret the collected data. This involves analyzing the collected data to detect patterns and/or sequences of photocurrent changes that correlate to particular gestures, some examples of which were discussed previously. Thus, a gesture supported by the gesture module 116 may be recognized based upon photocurrent input that is obtained via the photosensor array 202.

When a particular gesture is recognized, the recognition of the gesture causes the computing device to perform operations corresponding to the recognized gesture (block 408). Various operations corresponding to different contexts, applications, user interfaces and content associated with a computing device 102 may be triggered. In general, gestures may be used to control navigation of content, content/menu selections, views of the user interface, and so forth. In addition, tracking of changes across an array of sensors may be correlated to a relative tilt position of the computing device and motion of the device in 3D space (as opposed to motion of the user's hand). Thus, the collected data regarding changes in photocurrent may also be used for tilt detection and/or to implement motion detection for the computing device 102. Above surface gesture may be particularly applicable in situation in which a user may be unable to directly touch the display because a protective cover is being used, the user is positioned away from the device, and so forth. For instance, a waterproof case may prevent direct touches and above surface gestures may be used instead. Likewise, a user referencing a cookbook for cooking or a manual to assemble a product or make repairs could make use of above surface gestures to avoid having to put down tools, place dirty hands on the screen, and/or take their hands away too far away from the project at hand.

Figure 5:
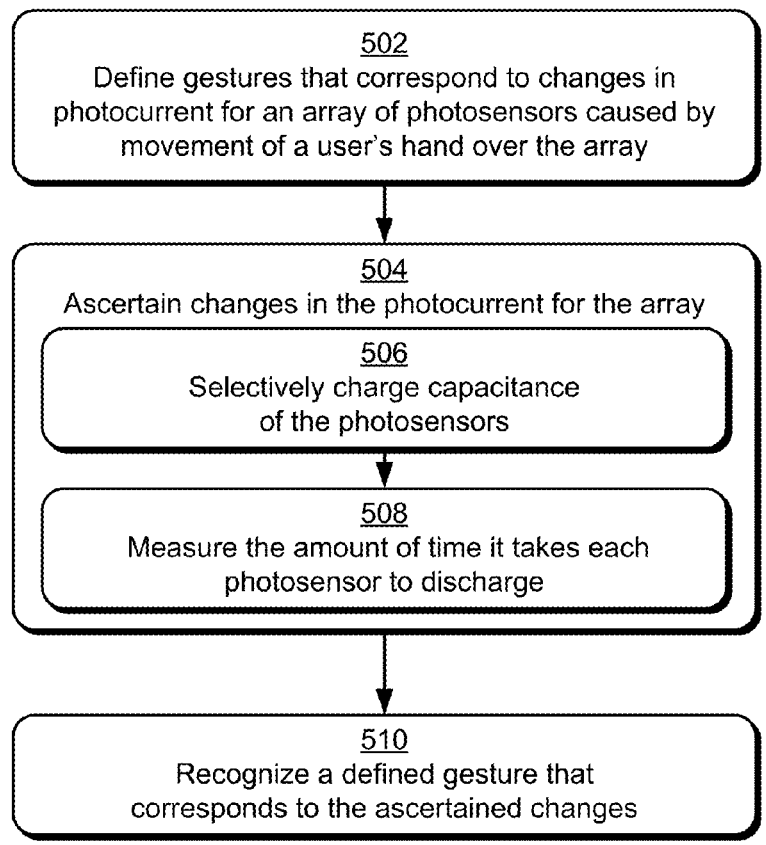
FIG. 5 is a flow diagram depicting an example procedure to define and recognize gestures based on changes in photocurrent associated with a photosensor array in accordance with one or more embodiments.

FIG. 5 depicts an example procedure 500 to define and recognize gestures based on changes in photocurrent associated with a photosensor array in accordance with one or more embodiments. Gestures are defined that correspond to changes in photocurrent for an array of photosensors caused by movement of a user's hand over the array (block 502). For example, various gestures may be defined as described above. In at least some embodiments, a variety of gestures supported by a device may be defined by a gesture module 116. Gestures may be defined in terms of input from a photosensor array as described herein as well as through other techniques such as touch-based and/or camera-based input. As mentioned, individual gestures may be defined based on a combination of input from multiple different input sources. In accordance with techniques described herein, at least some gestures are defined in terms of sequences of changes in photocurrent (e.g., patterns) for one or more photosensors in the array.

In particular, changes in photocurrent for the photosensor array are ascertained (block 504). This may occur in any suitable way. In one approach, capacitance of the photosensors is selectively charged (block 506) and the amount of time it takes to discharge the capacitance of each photosensor is measured (block 508). As described above, the time associated with discharge of capacitance correlates to the amount of light incident to a sensor and accordingly to photocurrent. Less light translates to less photocurrent and a longer discharge time. In some embodiments, values for photocurrent or light levels may be obtained directly from suitably configured sensors. In any case, data is collected that is indicative of changes in photocurrent for the photosensor array over time. Changes and patterns over time in photocurrent can be derived from timing data or directly from photocurrent data when available.

A defined gesture is recognized that corresponds to the ascertained changes (block 510). For example, the gesture detection system 118 may then interact with the gesture module 116 to match detected changes/patterns to corresponding gestures and/or to coordinate with input obtained from different input sources. The recognized gesture may trigger corresponding computing operations in a variety of contexts, examples of which were previously described.

Figure 6:
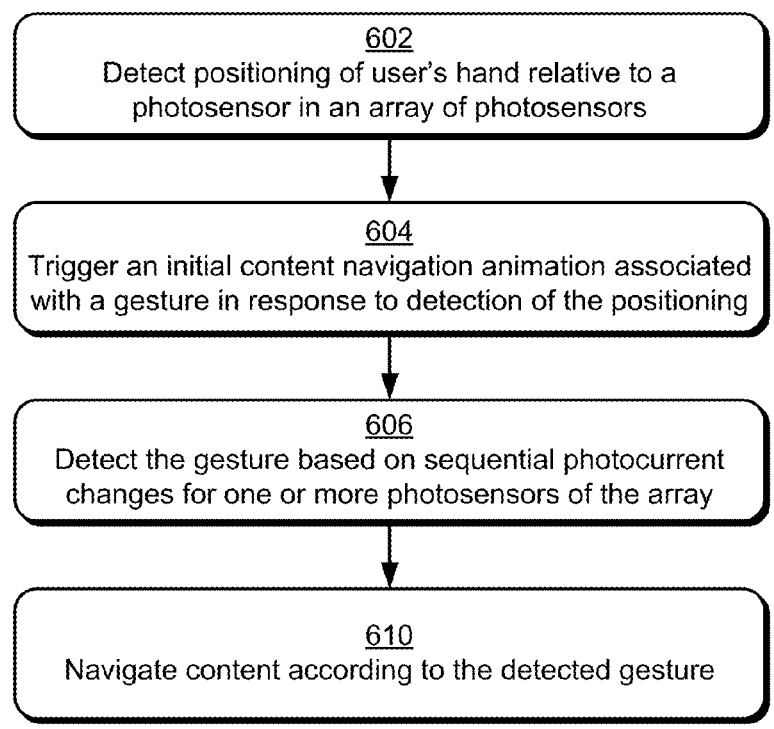
FIG. 6 is a flow diagram depicting an example procedure to implement content navigation gestures via a photosensor array that minimize perceptible delay.

FIG. 6 depicts an example procedure 600 to minimize perceptible delay for content navigation gestures detected via a photosensor array. Positioning of a user's hand relative to a photosensor in an array of photosensors is detected (block 602). For instance, relatively steady hovering of a user's hand above a particular sensor may be detected in the manner previously described. In a content navigation context, this action may be indicative of the user preparing to navigate, such as to turn a page of digital book, swipe through a media collection, navigate a system menu, interact with browser pages, and so forth. An initial content navigation animation associated with a gesture is triggered in response to detection of the positioning (block 604). Here, a bifurcated approach may be taken to minimize or eliminate perceptible delay as discussed previously. This involves performing operations corresponding to a gesture in stages. Rather than waiting until an end state for a gesture is detected, a portion of the operations corresponding to a gesture may be triggered as soon as the user positions their hand for the gesture. In the case of navigation animations, this may involve rendering a selected number of the initial frames for the animation, for example the first ten or so frames. This prepares the system to complete the animation when appropriate input is detected and may provide visual indications of the availability of the gesture to the user. In other contexts, preparation to complete operations may be initiated in a comparable manner. For example, in an object selection context a border may initially be placed around an object in response to position detection. Likewise, a picture transition animation such as a fade effect or fly-out effect may be initiated based on position detection in a picture viewing context. A variety of other examples are also contemplated.

The gesture is detected based upon sequential photocurrent changes for one or more photosensors of the array (block 606) and content is navigated according to the detected gesture (block 610). Here, after the initial position detection, the full sequence of photocurrent changes that defines the gesture may be detected in the manner described previously. In response, remaining operations for the gesture are completed to manipulate content in accordance with the particular gesture. The operations for the gesture may be continued at a point following the operations performed in the initial stage. Thus, in the preceding content navigation animation example, the animation may pick-up with the eleventh frame to complete the operations. In this way, perceptible delay associated with some gestures may be reduced or eliminated.

Having discussed some example procedures, consider now an example system that can be employed in one or more embodiments to implement aspects of photosensor array gesture detection techniques described herein.

Example System

Figure 7:
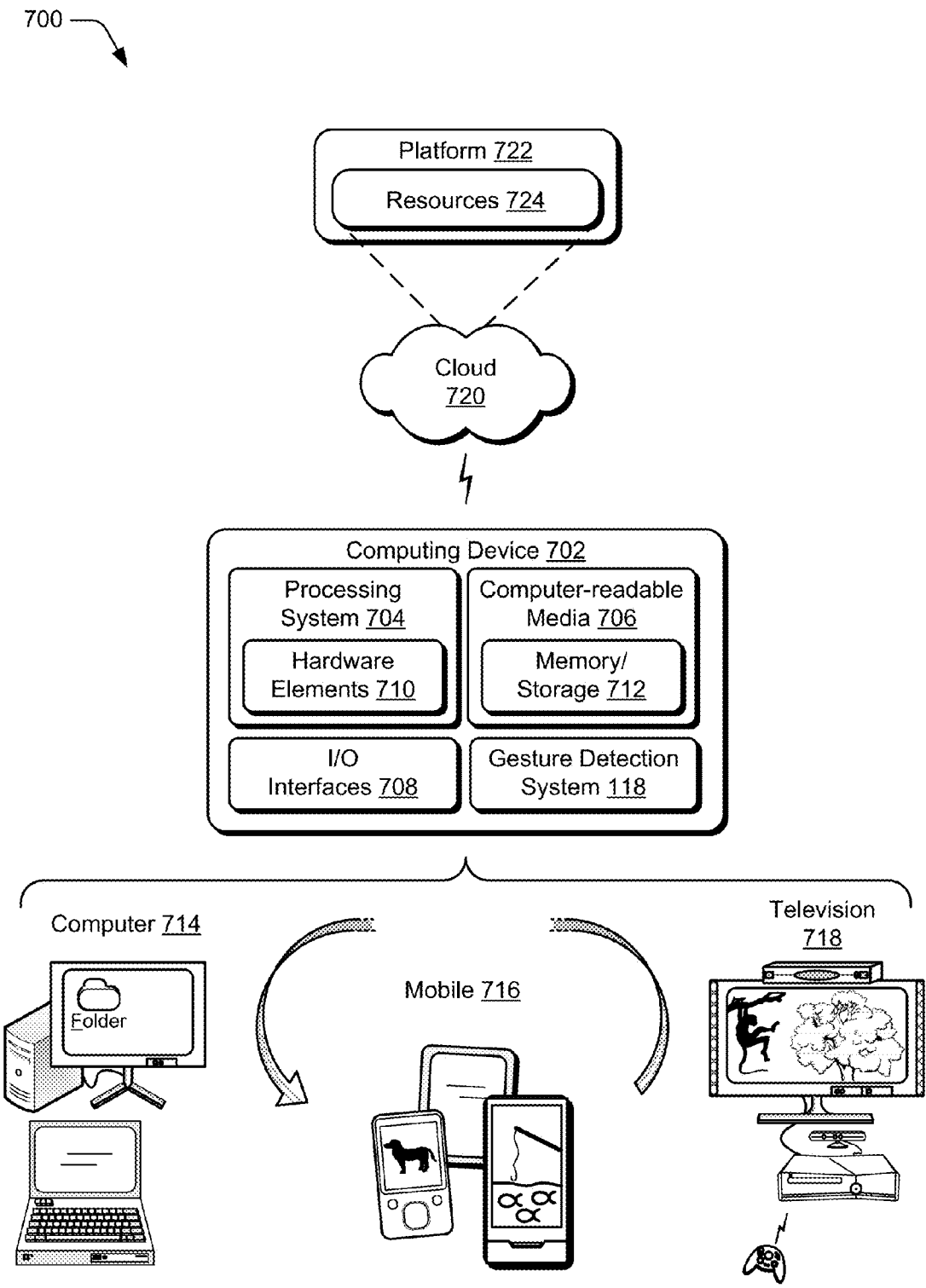
FIG. 7 illustrates various components of an example system that can be employed in one or more embodiments to implement aspects of photosensor array gesture detection techniques described herein.

FIG. 7 illustrates an example system 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 702, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, gesture module 116, gesture detection system 118, controller module 120, and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This is illustrated through inclusion of the gesture detection system 118 on the computing device 702. The functionality represented by the gesture detection system 118 and other modules may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   initializing an array of photosensors associated with a computing device;
   collecting data regarding photocurrent for the array of photosensors;
   recognizing a gesture based upon the collected data regarding the photocurrent, the gesture defined in terms of photocurrent changes responsive to changes in the amount of ambient light incident upon the array of photosensors over time, the changes in the amount of ambient light including changes caused by blocking the ambient light;
   causing the computing device to perform operations corresponding to the recognized gesture.

2. A method as described in claim 1, wherein the array of photosensors comprises light emitting diodes (LEDs) configured to operate as both light emitters and light detectors.

3. A method as described in claim 1, wherein the array of photosensors comprises light emitting diodes (LEDs) configured to operate as dedicated light detectors.

4. A method as described in claim 1, wherein the array of photosensors comprises photoresistors.

5. A method as described in claim 1, wherein the array of photosensors is integrated with a display device of the computing device.

6. A method as described in claim 1, wherein the array of photosensors is configured as a separate device that is connectable to the computing device.

7. A method as described in claim 1, wherein the initializing comprises charging capacitance associated with the photosensors.

8. A method as described in claim 7, wherein collecting data regarding photocurrent comprises collecting data regarding changes in photocurrent for the photosensors based upon discharge rates for the capacitance associated with the photosensors.

9. A method as described in claim 1, wherein collecting data regarding photocurrent comprises measuring sequential changes in light levels for individual sensors across the array of photosensors.

10. A computing device comprising:
    a display device;
    a photosensor array having a plurality of photosensors; and
    a gesture detection system configured to:
       define gestures that correspond to changes in photocurrent produced at least in part by blocking the ambient light reaching the plurality of photosensors in the photosensor array, the blocking being caused by movement of a user's hand over the photosensor array; and
       ascertain changes in the photocurrent for the photosensor array to recognize the defined gestures and cause the computing device to perform corresponding operations.

11. A computing device as described in claim 10, wherein the plurality of photosensors comprises light emitting diodes (LEDs).

12. A computing device as described in claim 10, wherein the plurality of photosensors is embedded in a housing for the computing device.

13. A computing device as described in claim 10, wherein the plurality of photosensors is arranged as an integrated component of the display device.

14. A computing device as described in claim 10, wherein the gesture detection system further includes a controller module to ascertain the changes in the photocurrent by:
    selectively charging capacitance of the plurality of photosensors; and
    measuring an amount of time it takes each photosensor to discharge.

15. A computing device as described in claim 10, wherein the gesture detection system further comprises a microcontroller having device logic to control operation of the photosensor array and input/output pins to which each of the plurality of photosensors is connected.

16. A computing device as described in claim 15, wherein the microcontroller is configured to ascertain the changes by:
    cycling input/output pins on a cathode side of the plurality of photosensors from a low output state to a high output state to charge capacitance of the plurality of photosensors;
    switching the input/output pins on the cathode side to an input state to discharge to capacitance; and
    starting timers to measure an amount of time it takes to discharge the capacitance of each of the plurality of photosensors.

17. A computing device as described in claim 10, wherein the changes in the photocurrent for the array are indicative of positioning and motion of a user's hand in three dimensional space relative to a surface of the display device.

18. One or more computer-readable storage media storing instructions that, when executed by a computing device, cause the computing device to implement a gesture detection system configured to perform operations including:
    collecting photocurrent data via an array of light emitting diodes (LEDs) configured to operate as photosensors, the photocurrent data indicative of changes in light levels for the array of LEDs over time that correlate to interaction of a user with the computing device, the changes in light levels being caused, at least in part, by blocking the light;
    analyzing the collected photocurrent data to detect patterns of changes in the light levels for the array of LEDs indicative of particular user interaction with the computing device;
    recognizing an above surface gesture corresponding to a pattern of changes in the light levels that is detected based on the analyzing; and
    causing the computing device to perform operations corresponding to the recognized above surface gesture.

19. One or more computer-readable storage media as described in claim 18, wherein the gesture detection system is further configured to perform operations including detecting tilt of the computing device in three-dimensional space that corresponds to a pattern of changes in the light levels that is detected based on the analyzing.

20. One or more computer-readable storage media as described in claim 18, wherein collecting photocurrent data via the array of light emitting diodes (LEDs) comprises:
- cycling a cathode side of a circuit for the LEDs between low and high output states to charge capacitance associated with the LEDs in multiple cycles; and
- during each of the multiple cycles:
    - switching the cathode side of the circuit to an input state to discharge the capacitance of the LEDs; and
    - timing the discharge of the capacitance of the LEDs to measure the amount of photocurrent associated with each of the LEDs.

* * * * *